United States Patent [19]
Bhagwat et al.

[11] Patent Number: 5,043,650
[45] Date of Patent: Aug. 27, 1991

[54] BATTERY CHARGER

[75] Inventors: Pradeep M. Bhagwat; Alan A. Gilmore, both of Baltimore, Md.; Fred S. Watts, Shrewsbury, Pa.

[73] Assignee: Black & Decker Inc., Newark, Del.

[21] Appl. No.: 161,017

[22] Filed: Feb. 26, 1988

[51] Int. Cl.$^5$ .............................. H02J 7/04
[52] U.S. Cl. ..................... 320/39; 320/23; 320/36; 363/132
[58] Field of Search ............ 320/22, 23, 35, 36, 320/39, 40, 21; 361/103, 106

[56] References Cited

U.S. PATENT DOCUMENTS

| | | | |
|---|---|---|---|
| 3,735,233 | 5/1973 | Ringle | 320/24 |
| 3,919,618 | 11/1975 | Coleman et al. | 320/39 |
| 3,967,168 | 6/1976 | Ellenberger | 320/36 |
| 4,021,717 | 5/1977 | Furuishi et al. | 320/39 |
| 4,092,711 | 5/1978 | Gerding et al. | 363/53 |
| 4,196,361 | 4/1980 | Nakata | 361/103 |
| 4,196,469 | 4/1980 | Gurwicz | 363/131 |
| 4,227,243 | 10/1980 | Gurwicz et al. | 363/132 |
| 4,243,929 | 1/1981 | Lenart | 320/23 |
| 4,270,080 | 5/1981 | Kostecki | 320/39 |
| 4,321,523 | 3/1982 | Hammel | 320/39 |
| 4,327,317 | 4/1982 | Heine et al. | 320/23 |
| 4,333,134 | 6/1982 | Gurwicz | 363/17 |
| 4,353,112 | 10/1982 | Rietveld et al. | 363/16 |
| 4,398,140 | 8/1983 | Horishita | 320/36 |
| 4,426,612 | 1/1984 | Wicnienski et al. | 320/39 |
| 4,531,083 | 7/1985 | Hoffman | 320/39 |
| 4,536,696 | 8/1985 | Ray | 320/21 |
| 4,558,407 | 12/1985 | Sterner | 363/132 |
| 4,564,800 | 1/1986 | Jurjans | 320/36 |
| 4,629,965 | 12/1986 | Fallon et al. | 320/39 |
| 4,649,333 | 3/1987 | Moore | 320/39 |
| 4,670,703 | 6/1987 | Williams | 320/22 |
| 4,682,262 | 7/1987 | Monsell | 361/6 |

FOREIGN PATENT DOCUMENTS

| | | |
|---|---|---|
| 0126936 | 12/1984 | European Pat. Off. |
| 0161109 | 11/1985 | European Pat. Off. |
| 2434350 | 1/1976 | Fed. Rep. of Germany |
| 3305224 | 8/1984 | Fed. Rep. of Germany |
| 3524518 | 2/1986 | Fed. Rep. of Germany |
| 524264 | 11/1976 | U.S.S.R. |
| 1245440 | 9/1971 | United Kingdom |
| 1450299 | 9/1976 | United Kingdom |
| 1578922 | 11/1980 | United Kingdom |
| 2007444B | 2/1982 | United Kingdom |
| 2085244A | 4/1982 | United Kingdom |
| 2103896A | 2/1983 | United Kingdom |
| 2070298B | 8/1984 | United Kingdom |
| 2155709A | 9/1985 | United Kingdom |

OTHER PUBLICATIONS

"Automatic Battery Charger"-ELEKTOR (Jul./Aug. 1979) 1, vol. 51/52, No. 7-8 (2 pages).
Elektor, No. 60, Apr. 1980, Canterbury GB—'Automatic Battery Charger".
N. T. I. S. Tech Notes, Feb. 1987, Springfield, VA., U.S.A.—p. 150 W. T. McLyman—"Ferroresonant Flux-Coupled Battery Charger" (NASA Tech Brief).

Primary Examiner—Steven L. Stephan
Assistant Examiner—Kristine Peckman
Attorney, Agent, or Firm—J. Bruce Hoofnagle

[57] ABSTRACT

An isolated battery charger suitable for charging lead-acid batteries includes a high-frequency power conditioner that rectifies source current to a DC value and chops the current at a comparatively high frequency, e.g., 25 KHz, using a pair of MOSFET switches (138 and 140) to provide power pulses to the primary of a step-down transformer ($T_1$). The output of the step-down transformer ($T_1$) is presented to an enhancement mode MOSFET (206) in series circuit with the battery (B) to be charged with the gate bias of the MOSFET controlled in response to the sensed voltage of the battery to provide current to the battery as a function of its charge. Control circuitry is provided to limit charging to a small 'trickle' level in the event the battery (B) is fully discharged to increase its charge level prior to initiating the full charge current. The provision of a voltage converter (100) operating at a relatively high frequency allows use of a lightweight and compact transformer ($T_1$) that nonetheless provides a high current for charging.

28 Claims, 3 Drawing Sheets

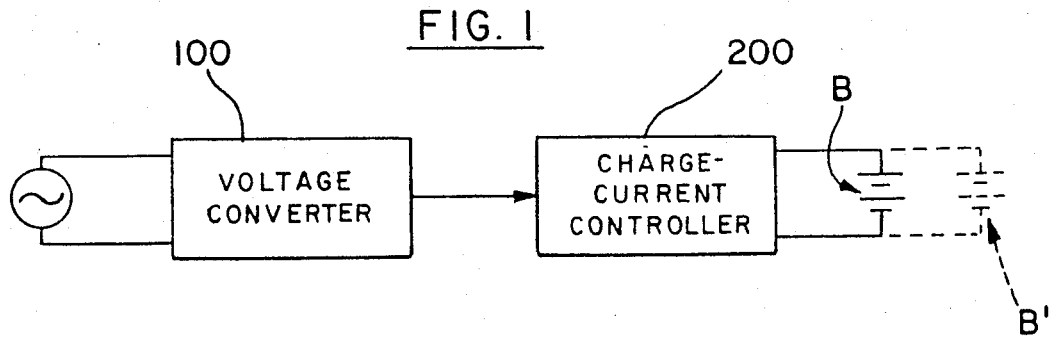
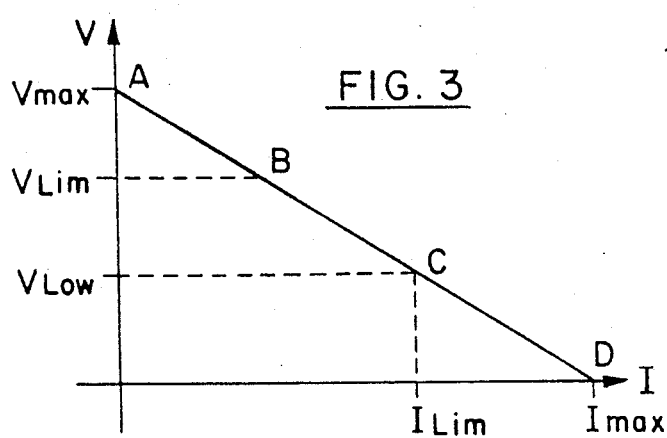
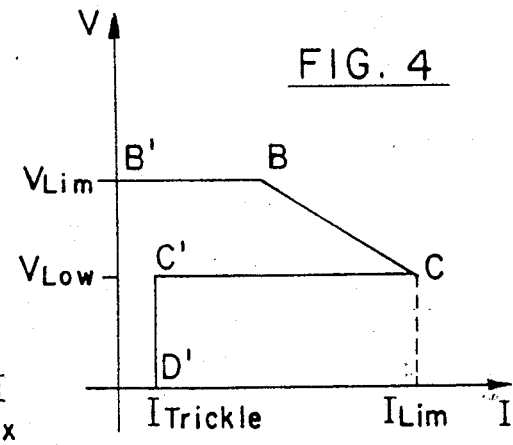
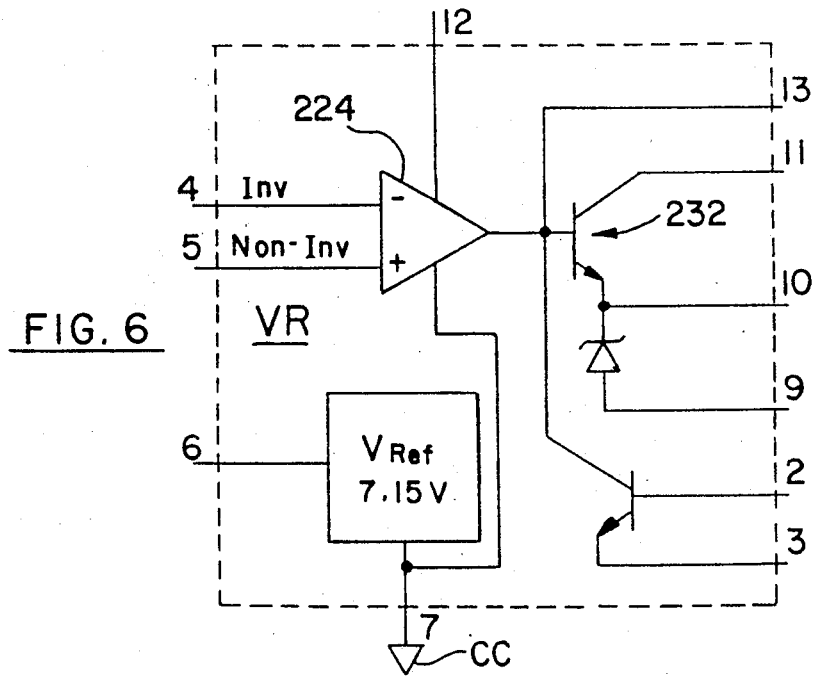

5,043,650

BATTERY CHARGER

CROSS REFERENCE TO RELATED APPLICATIONS

The subject matter of the present application is related to that disclosed in co-pending and commonly assigned U.S. Pat. Application Ser. No. 161,122, filed on even date herewith by Pradeep M. Bhagwat and entitled "Voltage Converter."

BACKGROUND OF THE INVENTION

The present invention relates to battery charging systems, and, more particularly, to battery charging systems in which the charging current and voltages are controlled to efficiently charge batteries without subjecting the charging circuitry to over-current operation or overcharging the batteries.

The trend in the use of rechargeable batteries in various types of tools and appliances has been increasing in the direction of heavier current, higher power applications. In the past, nickel-cadmium systems have enjoyed predominant use in hand-held power tools and other appliances. Nickel-cadmium systems, in general, have a long life in terms of the number of usable charge/discharge cycles but have relatively low energy per unit volume and a comparatively high initial cost. Where higher power devices are used, for example, in the more powerful motor driven hand-held power tools, traditional nickel-cadmium systems with sufficient power may not represent the optimum design choice from the cost standpoint. More cost efficient systems are available in other types of chemical battery systems including lead-acid systems which can provide comparatively high currents in compact and cost effective packages. The cell voltage of a lead-acid cell is about two volts as compared to 1.2 volts for the traditional nickel-cadmium cell and, accordingly, a lower number of lead-acid cells is required for a specific application relative to nickel-cadmium cells. In this regard, compact, gel-electrolyte or absorbed electrolyte lead-acid systems are available to provide sufficient power for driving the electric motors used in the larger hand-held power tools and other battery powered appliances.

The requirements for a battery charger designed for charging lead-acid cells are somewhat different from that typically considered as appropriate for nickel-cadmium systems. The impedance of lead-acid batteries varies greatly between a low, fully discharged impedance value and a relatively higher, full-charge impedance value. In addition, lead-acid batteries can be subject to sulfation in which a small fraction of the lead sulfate created during discharge is not driven into the electrolyte during charging, the sulfate tending to accumulate with time and the total number of discharge/charge cycles. Traditional battery chargers for lead-acid batteries include a step-down transformer that steps the input power (e.g., 120 VAC) down to a lower voltage that is rectified and presented to the battery through a SCR circuit. Where a high charge current is desired, e.g., on the order of four or more amperes, an adequately sized step-down transformer represents a relatively heavy and expensive component. However, a large transformer would not be considered as desirable for the physically small and lightweight chargers typically associated with hand-held tools and appliances. Even where the charger circuit is capable of providing a relatively high charge current, it is important that the current provided through the battery at the end of charge not be developed by presenting a high charging voltage, since this can unduly diminish the total number of discharge/charge cycles of the battery. Thus, in the design of a battery charger for higher current systems, it is important that the charge current be limited to a level that does not overload the charging circuit components and that the voltage levels presented to the battery be limited to a level that does not diminish the number of discharge/charge cycles or compromise the operational efficiency of the battery.

SUMMARY OF THE INVENTION

In view of the above, it is an object of the present invention, among others, to provide an improved battery charger for charging batteries.

It is another object of the present invention to provide a battery charger that precisely controls the voltage and current supplied to the battery in a manner consistent with providing an efficient charge cycle.

It is still another object of the present invention to provide an improved battery charger that is compact and lightweight in design and yet provides a relatively high charge current output.

It is a further object of the present invention to provide an improved battery charger circuit that provides a relatively high current output without the need for a comparatively large step-down transformer typically associated with such devices.

In view of these objects, and others, the present invention provides a battery charger system that is well-suited for charging batteries of the type intended for use in higher power portable tools and appliances. The charger system includes a power conditioner which conditions alternating source current into a direct current for presentation to the battery to be charged. The power conditioner rectifies the source current and converts it to a high-frequency pulsed current for presentation through a step-down transformer for rectification into direct current. The direct current is presented to the battery via a voltage controlled impedance with the battery voltage controlling the controlled impedance to limit the voltage presented to the battery to a selected value.

In the preferred embodiment, the alternating source current is rectified to a D.C. value and chopped at a comparatively high frequency, e.g., 25 KHz, by a pair of semiconductor switches and presented to the primary of a step-down transformer. The output of the step-down transformer is presented to a MOSFET in series circuit with the battery and which functions as a voltage variable impedance in both its linear and saturated regions. The gate bias of the MOSFET is controlled in response to the sensed voltage of the battery to provide current to the battery as a function of its charge. Control circuitry is provided to limit charging to a small 'trickle' level in the event the battery is initially discharged to increase its charge level prior to initiating the full charge current. The provision of a voltage converter operating at a relatively high frequency allows the use of a lightweight and physically compact transformer that nonetheless provides a high output current for charging.

The present invention advantageously provides a battery charger system in which charging current is controlled to charge a battery in a time efficient manner without subjecting the charging circuit to unduly high currents or subjecting the battery under charge to an over voltage situation and in which the use of a voltage converter operating at a high frequency allows the use of compact and lightweight components. A battery charger system is provided which is much smaller and has a lower weight than prior devices of similar capabilities and which is well suited for use in various types of rechargeable devices, including portable hand tools and appliances, as well as the traditional automotive environment.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is an overall block diagram of a battery charging system in accordance with the present invention;

FIG. 3 is an idealized graphical representation of voltage/current output characteristics for the voltage converter of FIG. 2;

FIG. 4 is a graphical representation of the voltage/-current charge characteristics provided by the charging-current controller of FIG. 1;

FIG. 6 is a schematic diagram of a representative voltage controller used with the charge current controller of FIG. 5.

DESCRIPTION OF THE PREFERRED EMBODIMENT

A battery charger system in accordance with the present invention is illustrated in general form in FIG. 1 and includes a voltage converter 100 which accepts input electrical power, such as 120 VAC or 220/240 VAC power, and provides conditioned current to a battery charge-current controller 200 which, in turn, provides charge-current to a battery B. In the preferred embodiment, the battery B is a 12-volt lead-acid battery, and, if desired, another 12-volt lead-acid battery B' (as represented in dotted line illustration) may be connected in parallel with the battery B to charge simultaneously both batteries B and B'. The simultaneous charging of two batteries B and B', as described above, can be used where the batteries eventually are connected in series to provide 24 volts for use in a 24-volt product.

Figure 2:
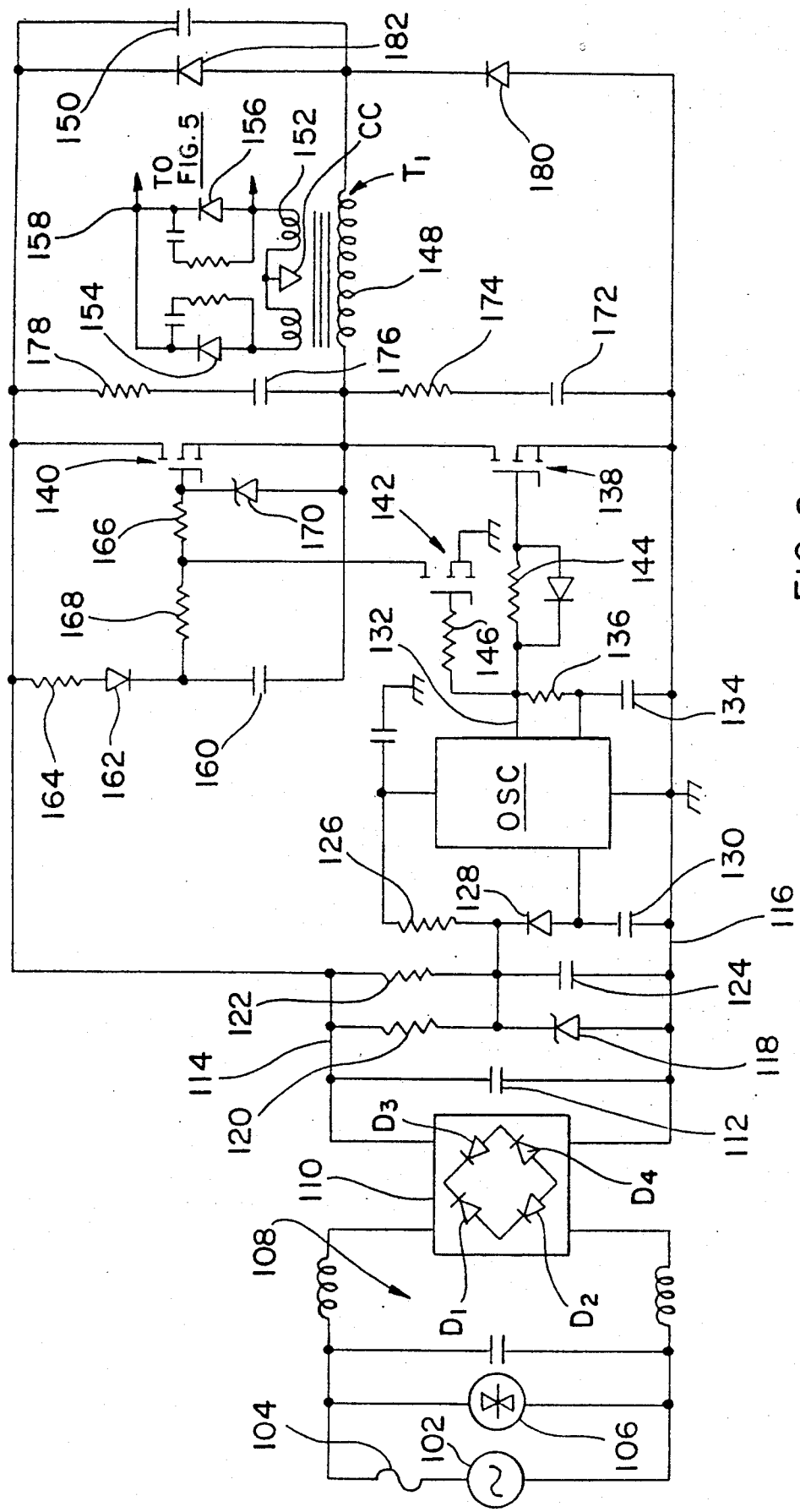
FIG. 2 is a circuit diagram of a voltage converter of FIG. 1.

As shown in the circuit diagram of FIG. 2, the voltage converter 100 accepts source power, for example, from a 120 VAC 60 Hz or 50 Hz source 102, and passes the source power through an input circuit that includes a fuse 104, a voltage spike limiter 106, and an inductive-capacitive filtering circuit, indicated generally at 108, to the input of a full-wave bridge rectifier 110 defined by diodes $D_1$, $D_2$, $D_3$, and $D_4$. The output of the rectifier 110 is filtered by a capacitor 112 and appears as a positive potential, e.g., 150 VDC, on the DC supply line 114 relative to a chassis ground line 116. A reference supply voltage is provided by a zener diode 118 in series circuit with resistors 120 and 122 between the DC supply line 114 and the chassis ground line 116 and in parallel circuit with a capacitor 124.

An astable multi-vibrator OSC receives its operating power from the reference supply voltage at the node between the zener diode 118 and the resistor 120 through a circuit which includes a resistor 126, a diode 128, and a capacitor 130, the latter component providing a "soft" start capability for the multi-vibrator OSC. The multi-vibrator OSC provides a recurring pulse output on an output line 132 with the pulse repetition rate controlled by a capacitor 134 and resistor 136 combination. In the preferred embodiment, a '555' CMOS astable RC timer functions as the multi-vibrator OSC with the capacitor 134 and resistor 136 combination providing an output square wave with a pulse repetition rate of, for example, 25 KHz, this rate being in the range of 350-600 times the input AC frequency. The output of the multi-vibrator OSC is used to provide gate potentials to N-channel enhancement mode switching MOSFETs 138, 140, and 142 which, in turn, periodically reverse the current flow through a transformer $T_1$, as explained more fully below. Suitable MOSFET transistors include the IRF-635 device manufactured by the International Rectifier Corp.

During operation of the multi-vibrator OSC, voltage of a first polarity appears on the output line 132 of the multi-vibrator OSC during a first half-cycle of each square wave output cycle and is coupled through a resistor 144 to the gate of the MOSFET 138 and through a resistor 146 to the gate of the MOSFET 142 to bias both of these MOSFETs to an ON state. When the MOSFET 142 is biased ON, the gate of the MOSFET 140 is effectively pulled to ground and held in an OFF state to prevent current conduction through the MOSFET 140. Concurrently, with the MOSFET 138 biased ON, a circuit path is completed from the chassis ground 116 through the MOSFET 138, the primary winding 148 of the transformer $T_1$ and a capacitor 150 to the DC supply line 114 to cause current to flow in a first direction through the primary winding 148 of the transformer $T_1$. During the period when the MOSFET 138 is ON, the capacitor 150 charges to a predetermined voltage level, for example, 75 volts with a similar voltage appearing across the primary winding 148 of transformer $T_1$. Thus the voltage potential across the capacitor 150 (75 volts) and the primary winding 148 (75 volts) of the transformer $T_1$ equals the voltage of 150 volts appearing between the lines 114 and 116. The voltage appearing across the secondary winding 152 of the transformer $T_1$ is stepped-down from the 75 volts appearing across primary winding 148. The secondary winding 152 is a split-secondary with a center tap connected to a circuit common node CC and is connected through a pair of rectifying diodes 154 and 156 to establish a prescribed DC voltage level between an output node 158 and the circuit common node CC. The DC voltage between the nodes 158 and CC represents the output of the voltage converter 100 which is applied to the battery charge-current controller 200, as explained more fully below in relationship to FIG. 5.

During the period when the MOSFET 138 is biased ON, the voltage at the output of the multi-vibrator OSC is provided to the gate of the MOSFET 142 to bias this MOSFET to its ON state and apply a ground potential to the gate of the MOSFET 140 to bias the MOSFET 140 OFF. In addition and during this period, a capacitor 160 is charged through a series-connected diode 162 and resistor 164 and the source and drain electrodes of the MOSFET 138.

When the pulse output of the multi-vibrator OSC switches to its opposite state during the next successive half-cycle, the MOSFET 138 and the MOSFET 142 are biased OFF to open the circuit in which the primary winding 148 of the transformer T₁ is connected, to open the ground circuit path to the gate of the MOSFET 140, and to discontinue charging of the capacitor 160. With the MOSFET 142 in its OFF state, the gate of the MOSFET 140 is effectively coupled through resistors 166 and 168 to the capacitor 160 to bias the MOSFET 140 to its ON state. With the MOSFET 140 in its ON state, the capacitor 150 and the primary winding 148 of the transformer T₁ are connected in a closed loop by the source and drain electrodes of the MOSFET 140 whereby the voltage (75 volts) of the capacitor 150 appears cross the primary winding 148 of the transformer T₁ to reverse the current flow in the primary winding 148. The stepped-down voltage output appearing at the secondary winding 152 of the transformer T₁ is likewise reversed and rectified by the diodes 154 and 156 to appear at the output node 158 as an output DC voltage for presentation to the charge-current controller 200.

Thus, during alternate half-cycles of each square wave cycle output of the multi-vibrator OSC, voltage of a first polarity is applied to the primary winding 148 of the transformer T₁ between line 114, through the capacitor 150, and the line 116 and then voltage of an opposite polarity is applied across the primary winding 148 from the source provided by the capacitor 150. The alternating current flow through the primary winding 148 establishes the alternating magnetic flux necessary for voltage transformation to the secondary winding 152 of the transformer T₁.

A zener diode 170 clamps the voltage applied to the gate of the MOSFET 140 to the saturation level of the MOSFET 140 to prevent the potentially harmful application of a voltage above the saturation level. A capacitor 172 and a resistor 174 form a snubber circuit for the MOSFET 138 while a capacitor 176 and a resistor 178 form a snubber circuit for the MOSFET 140. The snubber circuits each provide a bypass path for any spurious voltage spikes which could be harmful to the MOSFETs 138 and 140.

If an overcurrent situation occurs in the output of the transformer T₁ when the MOSFET 138 is ON, e.g., a short-circuit or overload condition in the charge-current controller 200 (FIG. 5), the inductive impedance of the transformer T₁ becomes extremely small and the capacitor 150 will charge quickly to the level of the supply voltage (150 volts) between the lines 114 and 116. The magnitude of the field about the inductive circuit presented by transformer T₁ under these conditions is significantly large and seeks to keep the current flowing in the same direction by virtue of the stored energy in the magnetic field. Normally, this condition would cause the capacitor 150 to charge to an even higher voltage level and would start the circuit into an undesirable oscillation mode, thereby saturating the transformer T₁.

In order to prevent this overload induced oscillation with the MOSFET 138 biased to its ON state, the current resulting from the stored energy of the magnetic field of the inductive circuit of the transformer T₁ is directed through a loop which includes the drain and source electrodes of the MOSFET 138, a diode 180, and the primary winding 148 of the transformer T₁. The resulting current continues in this loop until the field has completely dissipated. During this time, the charge on the capacitor 150 remains at the supply voltage level (150 volts) and any tendency for oscillations are damped to preclude any catastrophic event during the period when the MOSFET 138 is in its ON state.

When the MOSFET 138 is switched to its OFF state and the MOSFET 140 is switched to its ON state during the overload or short circuit condition, the capacitor 150 is now in a closed loop with the transformer inductance and the drain and source electrodes of the MOSFET 140. The capacitor 150 remains charged to the level of the previous charge (150 volts) which is the charge achieved during the period when the MOSFET 138 was in its ON state. Due to the low impedance in the inductive circuit of the transformer T₁, the previously charged capacitor 150 discharges rapidly through the low impedance to essentially zero volts. As the capacitor 150 discharges rapidly, a magnetic field is developed rapidly about the transformer inductance. When the capacitor 150 is fully discharged, the stored energy of the field about the transformer T₁ tends to maintain current flow in the same direction as when the capacitor 150 was discharging; the continued current flow normally charging the capacitor 150 in the negative direction. With the capacitor 150 charged in the negative direction, the power supply and the negative charge on the capacitor 150 would then be in a cumulative arrangement to provide a total voltage which greatly exceeds 150 volts when the MOSFET 138 is again biased to its ON state.

This condition could again lead to a catastrophic event because of the significant voltage levels which would lead to the saturation of the transformer T₁ and the resultant destruction of circuit components. A diode 182 is connected in parallel circuit with the capacitor 150 to preclude the reverse charging of the capacitor 150. After the capacitor 150 has been fully discharged, the current resulting from the stored energy of the magnetic field of the transformer T₁ will seek the least-impedance path and pass through the diode 182 to bypass the capacitor 150. Eventually, the stored energy is fully dissipated and a steady-state condition attained for the remainder of the period when the MOSFET 140 is in its ON state.

Thus, by connecting the diodes 180 and 182 in the voltage converter 100, undesirable oscillations in the converter are precluded when a short circuit or overload occurs in any load, such as the battery charge-current controller 200 connected to the output of the transformer T₁.

The voltage converter 100 operates, as shown in FIG. 3, along a load line A-B-C-D that represents the voltage-current levels occurring during operation of the converter 100. If $V_{max}$ is applied to the battery B for a sustained period, the useful life of the battery B, in terms of the ultimate number of discharge/charge cycles, will be shortened. Likewise, operation of the voltage converter 100 at the $I_{max}$ current level will overload and possibly damage current carrying components of the voltage converter 100. As explained in more detail below, provisions are made to insure that operation at the $V_{max}$ and $I_{max}$ conditions do not occur. To this end, the battery charge-current controller 200 includes control circuitry which confines the charging operation on the load line between portions B-C as illustrated in FIG. 4. For a 12-volt battery B and in the context of the present invention, this establishes a $V_{low}$ at about 5.5 volts and a $V_{lim}$ (that is, the upper voltage limit) at about 14.1 volts.

Also, the maximum current level is set at $I_{lim}$ (that is, the maximum current level) which is less than $I_{max}$.

The actual operational load line for the voltage converter 100, as illustrated in FIG. 4, includes consideration for trickle current operation. Constant voltage charging occurs at portion B-B' of the load line while quasi-constant current charging occurs at current values around 5 amps on the portion C-B of the load line. Trickle charging occurs at portion D'-C' portions of the load line.

Figure 5:
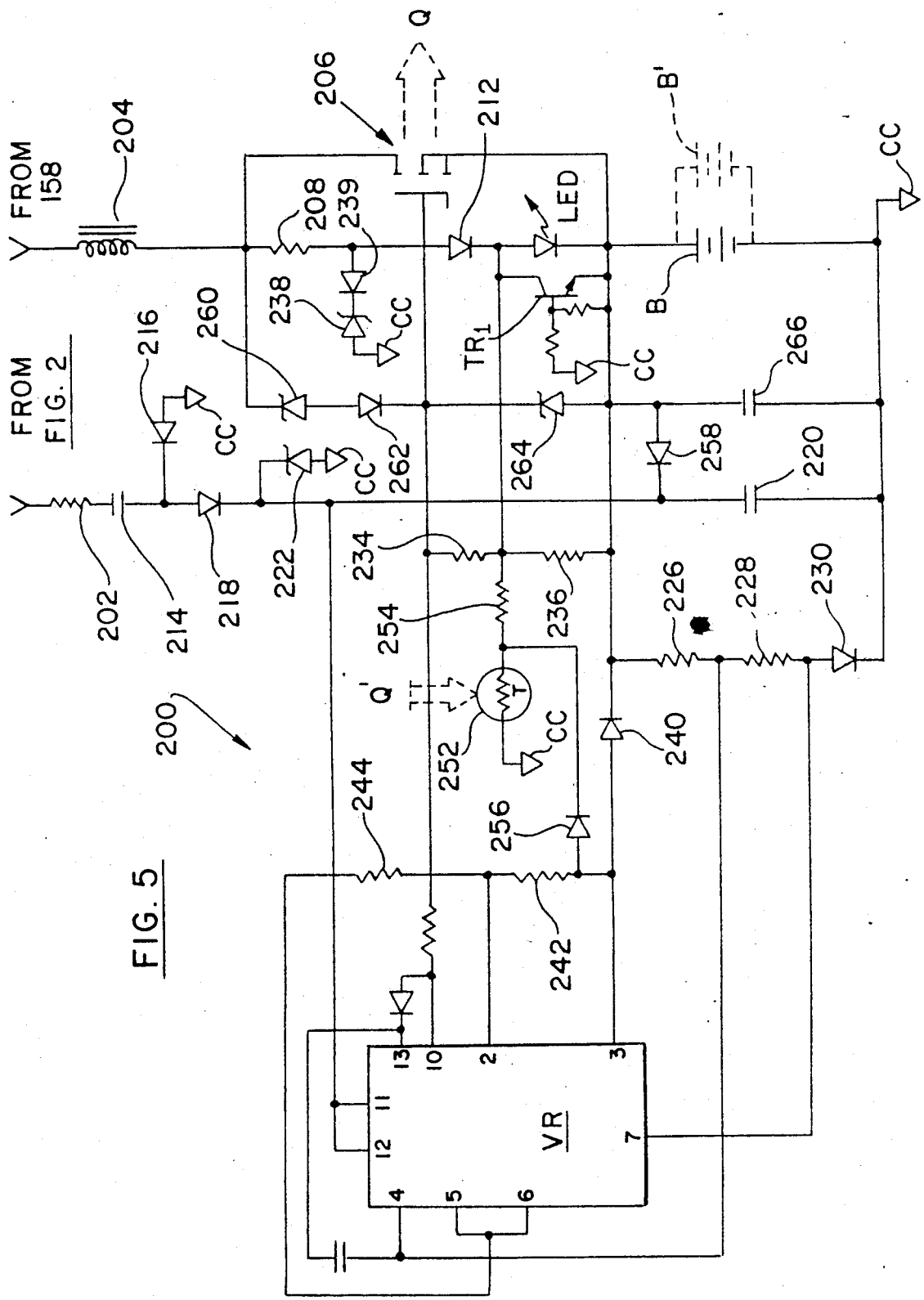
FIG. 5 is a circuit diagram of the charge current controller of FIG. 1.

Further details of the structure and function of the voltage converter 100 may be had by reference to the above-referenced patent application, the disclosure of which is incorporated herein by reference As shown in FIG. 5, the output of the voltage converter 100 is applied to the battery charge-current controller 200 through a resistor 202 and a current smoothing filter such as an inductor 204. The filtered output of the voltage converter 100 is then applied through the source and drain electrode of a voltage controlled variable impedance device, such as a MOSFET transistor 206 in series circuit with the battery B to be charged. The MOSFET 206 is controlled by application of an appropriate gate potential $V_g$ to insure that the charging of the battery B follows the load line of FIG. 4. In the preferred embodiment, the MOSFET 206 is an N-channel enhancement mode FET such as the model IRF-530 manufactured by the International Rectifier Corp. The MOSFET 206 operates in its saturated region as represented by load line portion B-C, in its linear region represented by load line portion B-B', and is in its OFF state during trickle current flow through a current bypass circuit which includes a series-connected resistor 208, a diode 212, and a light emitting diode LED, the bypass circuit shunting the source and drain electrodes of the MOSFET 206 and providing a trickle current flow as represented by the load line portion D'-C' of FIG. 4.

The MOSFET 206 is controlled by application of a control voltage $V_g$ to its gate from a voltage regulator VR, such as a LM723 regulator manufactured by National Semiconductor Corp., Santa Clara, CA 95051. The specific internal organization of the voltage regulator VR is illustrated in FIG. 6. Operating power for the voltage regulator VR is established through a voltage doubler circuit which includes a capacitor 214, a pair of diodes 216 and 218, and a filter capacitor 220. In order to insure that the operating voltage applied to voltage regulator VR is not excessive, a zener diode 222 clamps the voltage to a safe level, for example, below 36 volts. The voltage doubler circuit insures that the voltage regulator VR provides sufficient gate voltage $V_g$ to control the MOSFET 206

The voltage developed by the voltage doubler is applied to pins 11 and 12 of the voltage regulator VR with a reference voltage $V_{ref}$ of 7.15 volts developed internally within the voltage regulator VR and applied through pin 6 to pin 5 to the non-inverting input of an operational amplifier, such as op amp 224 (FIG. 6), configured as an error amplifier.

The battery B is connected in a series loop circuit which includes a pair of resistors 226 and 228, which define a voltage divider, and a diode 230 with the cathode of the diode 230 and the negative side of the battery B connected to the circuit common node CC and the anode of the diode 230 connected to pin 7 of the voltage regulator VR. If the battery B is connected to the charge-current controller 200 in the reverse direction, the diode 230 is reverse biased and prevents current flow. When the battery B is connected properly, current can flow through the now forward-biased diode 230. A voltage drop is developed across the resistors 226 and 228 and the diode 230 with the voltage appearing at the node between the resistors 226 and 228 being slightly more than one-half of the battery B voltage. The voltage at the node between the resistors 226 and 228 is coupled to the inverting input of the op amp 224 at pin 4 which determines whether the MOSFET 206 is to operate in its saturated region or its linear region.

If the battery B voltage is less than 5.5 volts, battery charging through the MOSFET 206 will not occur. When the battery voltage is more than 5.5 volts but less than 14.1 volts, the voltage at the node between the resistors 226 and 228 is less than the 7.15 volts $V_{ref}$ value. The MOSFET 206 is then driven by an appropriate gate voltage to operate in its saturated region to provide maximum current available from the voltage converter 100 to charge the battery B with the current flowing as a function of the load line for the output of the voltage converter 100, as shown in FIG. 3. This condition occurs when the inverting input of the op amp 224 is lower than the non-inverting $V_{ref}$ input whereby the output of the op amp 224 biases a regulator transistor 232 (FIG. 6) into conduction with the output voltage $V_o$ at pin 10 driven high to about 15 volts. This gate voltage $V_g$ is sufficient to bias the MOSFET 206 to saturation. With the MOSFET 206 operating in its saturation region, a large amount of current at a quasi-constant level (i.e., 5 amps) will flow through the battery B as represented by load line portion C-B to effect charging at the maximum rate.

During operation of the MOSFET 206 in the saturation mode, there is extremely limited impedance in the current supply path for charging the battery B. Therefore, without some form of current level control, the current supplied by the voltage converter 100 to charge the lead-acid battery B could be exceptionally high. While this high-level current would probably not damage the battery B, it could result in damage to a variety of components in the voltage converter 100 as well as in the battery charge-current controller 200.

To facilitate current level control during a battery charging cycle, transformer $T_1$ of the voltage converter 100 includes, for example, a U-shaped core (not shown) with a precise number of the windings of the primary winding 148 and the secondary winding 152 being wound on spaced legs of the core to maximize the leakage inductance of the transformer $T_1$. This establishes a predetermined impedance level at the established frequency of 25 KHz which limits the maximum level of current to be supplied by the voltage converter 100 to battery B. Therefore, when the MOSFET 206 operates in the saturated mode, the leakage inductance of the transformer $T_1$ prevents an excessive buildup of current within the voltage converter 100. This limits the level of current supplied to the battery charge-current controller 200 notwithstanding the operation of the MOSFET 206 in the saturation mode and thereby protects the various components of the converter 100 and the controller 200. Thus, the current supplied to the battery B during the saturation-mode operation of the MOSFET 206 will be controlled by the demands of the battery B in drawing charging current but in no event shall the current exceed the maximum level established by the leakage inductance impedance of the transformer $T_1$.

A pair of resistors 234 and 236 normally divide the voltage (15 volts) from pin 10 of the voltage regulator VR so that approximately six volts appears at the node between the resistors 234 and 236. A light emitting diode LED clamps the voltage across the resistor 236 to approximately two volts (the forward voltage drop of the LED) whereby the light emitting diode LED is illuminated to indicate that the battery B is charging at a high current level by virtue of the saturated operation of the MOSFET 206.

When the terminal voltage of the battery B increases by virtue of the high-current charge to a level of 14.1 volts, at point B (FIG. 3) on the load line, or, if the battery B is at 14.1 volts when it is inserted into the charge-current controller 200, the op amp 224 senses that the node between the resistors 226 and 228 is 7.15 volts and that the inverting and non-inverting inputs to the op amp 224 are substantially equal. Under this condition, the output voltage $V_o$ at pin 10 is reduced until the MOSFET 206 enters its linear region, a gate voltage $V_g$ of about five volts being appropriate. This linear operation will maintain 14.1 volts ($V_{lim}$) across the battery B as represented by the load line portion B-B' while decreasing the level of current supplied to the battery B until point B' is reached.

As the gate potential $V_g$ drops with the increasing battery B voltage as the MOSFET 206 continues to operate in its linear region, the gate potential $V_g$ is divided by the resistors 234 and 236 until approximately 1.9 volts appears at the node between the resistors 234 and 236. This voltage is less than the forward voltage drop (viz., two volts) of the light emitting diode LED, and the light emitting diode LED is extinguished during the linear operation of the MOSFET 206.

Linear operation occurs during approximately the last 15 percent of the charging cycle and, as noted above, begins when the voltage of the battery B attains 14.1 volts. Thus, the light emitting diode LED remains illuminated when the battery B is undergoing full charge and is extinguished when the battery B is approximately 85 percent charged (i.e., reaches 14.1 volts) thereby indicating to the user that the battery B is ready to be used. During the linear operating mode, decreasing levels of current are supplied to the battery B as represented by the load line portion B—B'. Eventually, when point B' is approached, the gate voltage $V_g$ lowers until the MOSFET 206 is nearly off whereby the current decays to a maintenance level and the charging cycle is completed.

It is noted that the diode 230 also provides temperature compensation for the battery charge-current controller 200 in the control of the operation of the MOSFET 206. When the controller 200 is operating in a normal mode within an acceptable temperature environment, the voltage appearing at the node between the resistors 226 and 228 accurately represents the voltage condition of the battery B whereby the operation of the MOSFET 206 is controlled accordingly as described above.

If the temperature within the controller 200 approaches an undesirable level because the battery B or other components within the controller are becoming overheated, or if the controller 200 overheats because of conditions external of the controller, the diode 230 heats correspondingly. Due to the negative temperature coefficient characteristics of the diode 230, the forward voltage drop of the diode will decrease with an increase in temperature whereby the voltage appearing at the node between resistors 226 and 228 will increase. This causes the voltage regular VR to control the operation of the MOSFET 206 whereby the level of voltage applied to the battery B is decreased as a compensation for the undesirable increase in temperature.

Other circuit configurations could be utilized to attain the temperature compensation effect without departing from the spirit and scope of the invention. For example, additional diodes could be connected in series with the diode 230, to provide this effect.

The trickle charge circuit, including the resistor 208, the light emitting diode LED, and the diode 212, functions to supply a low charging current when a battery B having a terminal voltage below 5.5 volts is connected to the charger. In general, a fully discharged or sulfated battery B will typically have a terminal voltage below 5.5 volts. As noted above, battery voltages below 5.5 volts will not trigger the charging of the battery B through the MOSFET 206 and a trickle current is needed to bring the battery voltage to or above the level of 5.5 volts. In order to trickle charge the battery B, the resistor 208 provides a trickle current path to the battery B through the light emitting diode LED and the diode 212. The trickle current will gradually charge the battery B to a voltage above 5.5 volts at which time the MOSFET 206 will then turn on in the manner described above and operate in its saturated region to supply a high charging current to the battery B. Since the trickle current can only be used at relatively low battery voltages (e.g., 10 volts or less), a 12-volt zener diode 238 is connected to divert the trickle current to ground when the battery voltage is above ten volts.

If the battery clips or terminals become shorted, the charge-current controller 200 is designed to turn off the MOSFET 206 to protect the voltage converter 100. As noted above, the MOSFET 206 will turn off if the battery voltage (i.e., the voltage at the battery terminals) is less than 5.5 volts. The positive battery terminal is connected to pin 6, or $V_{ref}$, of the voltage regulator VR through a diode 240 and a pair of resistors 242 and 244. When the battery voltage is less than 5.5 volts, a 0.65 volt drop appears across resistor 242 and is applied to the voltage regulator VR between pins 2 and 3, which are the current limit and current sense terminals, respectively. The voltage regulator VR turns off, the output voltage $V_o$ (pin 10) goes low, and the gate voltage $V_g$ applied to the gate of the MOSFET 206 causes the MOSFET 206 to enter its OFF state.

If the battery B is reverse connected, the MOSFET 206 is turned off in the same manner described above with respect to shorted battery clips or terminals. Also, the diode 230 prevents leakage current from flowing through the voltage regulator VR from pin 7 to pin 10. This leakage current would otherwise drive the MOSFET 206 to its ON state during a reversed battery condition.

A diode 239 is connected in series with the zener diode 238 to prevent reverse current flow through the zener diode 238 and the light emitting diode LED in the event that the battery B is reverse connected in the charger system. Therefore, the inclusion of the diode 239 prevents damage to the light emitting diode LED. Also, if the battery B is reverse connected in the charger system, a small amount of current will flow in the trickle current circuit from transformer $T_1$ and could result in the illumination of the light emitting diode LED thereby providing a false indication to the user that a normal charge cycle is in progress. To prevent the light emitting diode LED from illuminating during the reverse connection condition, the emitter-collector circuit of a transistor $TR_1$ is biased on to provide a by-pass path for the current around the light emitting diode LED. When the battery B is reverse connected, the transistor TR₁ is biased on to provide a by-pass path for the current around the light emitting diode LED. In this manner, the light emitting diode LED is not illuminated thereby avoiding the false indication to the user.

A negative-temperature-coefficient thermistor 252 is connected in series with a resistor 254 to form a voltage divider. In this manner, the voltage at the anode of the light emitting diode LED is divided and applied to the cathode of a diode 256. As the thermistor 252 is heated by virtue of the heat (as represented by the dashed line heat paths Q and Q') from the MOSFET 206, the resistance of the thermistor 252 decreases to reduce the voltage at the cathode of the diode 256. Eventually the cathode of the diode 256 is pulled below 5.5 volts to turn off the MOSFET 206 in a manner similar to the performance of the diode 240 with respect to the shorted battery clip condition.

When the MOSFET 206 turns off, the voltage across the light emitting diode LED changes from two volts to zero volts. Since the voltage divider ratio between the thermistor 252 and the resistor 254 cannot change instantly, the voltage at the anode of the diode 256 drops further to approximately 4.5 volts. As the MOSFET 206 cools, the thermistor 252 increases in resistance thereby increasing the voltage at the cathode of the diode 256. The MOSFET 206 will cool several degrees before it turns on again at 5.5 volts.

The temperature of the MOSFET 206 will therefore "oscillate" between two temperature limits. Eventually the source/drain current will diminish enough (i.e., the battery is charged) such that very little current flows and the temperature decays to a point where the MOSFET 206 stays ON.

A zener diode 260 and a diode 262 are connected to protect the drain/source terminals of the MOSFET 206 from voltage surges. The gate/source terminals are protected from voltage surges by a zener diode 264.

A capacitor 266 is connected across the battery B and stabilizes the voltage of the battery B. If the battery B is removed from the charge-current controller 200 during a period when a charging cycle is in progress (i.e., current is flowing through the current smoothing inductor 204), the stored energy of the inductor 204 quickly collapses causing a high transient current and associated voltage spike in the charge-current controller 200. To prevent any damage during the occurrences of the voltage spike, a diode 258 diverts the energy through the low-impedance path presented by the capacitor 220.

The charge-current controller 200 may be used to charge other batteries having voltage and current characteristics similar to lead-acid batteries including, but not limited to, rechargeable lithium batteries. While the present invention has been disclosed in the context of lead-acid batteries intended for hand-held power tools and appliances, the disclosed battery charger is equally well-suited for charging batteries used in motor vehicles.

While the preferred embodiment has been disclosed as using N-channel MOSFETs, complementary devices are likewise suitable. Additionally, the above-indicated voltage and current levels may be varied to accommodate batteries having various numbers of the cells and cell capacities (i.e., ampere-hour rating).

The present invention advantageously provides a compact and lightweight battery charger system in which a voltage converter efficiently converts source energy into a form for charging a battery and in which charging current is controlled to charge a battery in a time efficient manner without subjecting the charging circuit to unduly high currents or subjecting the battery under charge to an over voltage situation. The use of a voltage converter operating at a high frequency allows the use of compact and lightweight components, especially voltage converting transformers, in comparison to prior devices.

Thus it will be appreciated from the above that as a result of the present invention, an improved battery charger is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A battery charger comprising:
   voltage converter means for converting a first-frequency alternating source voltage into a second-frequency alternating voltage and converting the second-frequency alternating voltage into a direct current voltage which appears at an output of the voltage converter means;
   voltage controlled solid-state variable impedance means for connection between the output of the voltage converter means and a battery to be charged for controlling the flow of direct current from the output of the converter means to the battery to effect charging thereof;
   control means responsive to the battery voltage to provide a control voltage to said variable impedance means to charge the battery at a selected rate and to cease charging at a predetermined charge level;
   the control means controls said variable impedance means to its OFF state when the voltage of the battery is below a selected value; and
   wherein the variable impedance means includes a saturated region and a linear operating region in which the impedance thereof is controlled as a proportional function of the control voltage and further includes an OFF state in which the impedance is sufficiently high to cease the charging of the battery through the variable impedance means.

2. The battery charger of claim 1, wherein said variable impedance means is in series circuit with said battery and said voltage converter means.

3. The battery charger of claim 1, further comprising:
   a trickle current charge path for charging the battery when said variable impedance means is in its OFF state and the voltage of the battery is below the selected value.

4. The battery charger of claim 3, wherein said trickle current charge path further comprises a light emitting diode that is forward biased when a current flows through said trickle current charge path.

5. The battery charger of claim 3, wherein said trickle current charge path is in shunt circuit with said variable impedance means.

6. The battery charger of claim 1, wherein said control means comprises:

voltage regulator means for providing the control voltage to said variable impedance means in response to a reference voltage and the voltage of the battery being charged.

7. The battery charger of claim 6, wherein said voltage regulator comprises an error amplifier for providing the control voltage to said voltage-controlled variable impedance means in response to the difference between the reference voltage and a voltage representative of the voltage of the battery being charged.

8. The battery charger of claim 1, further comprising:
temperature compensating means responsive to an increase in the temperature of said control means above a prescribed level for controlling the voltage controlled variable impedance means to thereby decrease the voltage applied to the battery as compensation for the temperature increase.

9. The battery charger of claim 1, further comprising:
temperature control means for increasing the impedance of said variable impedance means when the temperature thereof increases above a selected value.

10. The battery charger of claim 9, wherein said temperature control means decreases the impedance of said voltage variable impedance means when the temperature thereof decreases below the selected value.

11. The battery charger of claim 10, wherein said temperature control means comprises a temperature responsive resistance in heat conducting relationship with said variable impedance means.

12. The battery charger of claim 1, wherein the frequency of said second-frequency alternating voltage is between 350 and 600 times the frequency of said first-frequency alternating source voltage.

13. The battery charger of claim 1, further comprising:
a light emitting diode in circuit with said voltage controlled variable impedance and forwardly biased when said variable impedance in its saturated region.

14. The battery charger of claim 1, wherein said variable impedance means is a field effect transistor.

15. The battery charger of claim 1, further comprising a step-down transformer for stepping down said second-frequency alternating voltage.

16. The battery charger of claim 15, further comprising:
means for rectifying the stepped down second-frequency alternating voltage of said step-down transformer.

17. A battery charger comprising:
means for providing a direct current voltage for charging a battery;
voltage controlled solid-state variable impedance means for connection between the providing means and the battery to be charged for controlling the flow of current from the providing means to the battery to effect charging thereof;
control means responsive to the battery voltage to provide a control voltage to said variable impedance to charge the battery at a selected rate and to cease charging at a predetermined charge level;
wherein said variable impedance means is in series circuit with said battery and includes a saturated region and a linear operating region in which the impedance thereof is controlled as a proportional function of the control voltage and further includes an OFF state in which the impedance is sufficiently high to cease the charging of the battery, and wherein said control means controls said variable impedance means to its OFF state when the voltage of the battery is below a selected value.

18. The battery charger of claim 17, wherein said control means comprises:
voltage regulator means for providing the control voltage to said voltage controlled variable impedance means in response to a reference voltage and the voltage of the battery being charged.

19. The battery charger of claim 18, wherein said voltage regulator comprises an error amplifier for providing the control voltage to said voltage controlled variable impedance means in response to the difference between the reference voltage and a voltage representative of the voltage of the battery being charged.

20. The battery charger of claim 17, further comprising:
temperature control means for increasing the impedance of said variable impedance means when the temperature thereof increases above a selected value.

21. The battery charger of claim 20, wherein said temperature control means decreases the impedance of said variable impedance means when the temperature thereof decreases below the selected value.

22. The battery charger of claim 21, wherein said temperature control means comprises temperature responsive resistance in heat conducting relationship with said variable impedance means.

23. The battery charger of claim 17, further comprising:
temperature compensating means responsive to an increase in the temperature of said control means above a prescribed level for controlling the voltage controlled variable impedance means to thereby decrease the voltage applied to the battery as compensation for the temperature increase.

24. The battery charger of claim 17, further comprising:
a light emitting diode in circuit with said variable impedance means and forwardly biased when said variable impedance means is in its saturated region.

25. The battery charger of claim 17, wherein said variable impedance means is a field effect transistor.

26. A battery charger comprising:
means for providing a direct current voltage for charging a battery;
voltage controlled solid-state variable impedance means for connection between the providing means and the battery to be charged for controlling the flow of current from the providing means to the battery to effect charging thereof;
control means responsive to the battery voltage to provide a control voltage to said variable impedance to charge the battery at a selected rate and to cease charging at a predetermined charge level, and
a trickle current charge path for charging the battery when the variable impedance means is in its OFF state and the voltage of the battery is below a selected value.

27. The battery charger of claim 26, wherein said trickle current charge path is in shunt circuit with said variable impedance means.

28. The battery charger of claim 26, wherein said trickle current charge path further comprises a light emitting diode that is forward biased when a current flows through said trickle current charge path.

* * * * *